No. 870,106. PATENTED NOV. 5, 1907.
J. J. JONES.
GEAR WHEEL.
APPLICATION FILED FEB. 18, 1907.
2 SHEETS—SHEET 1.
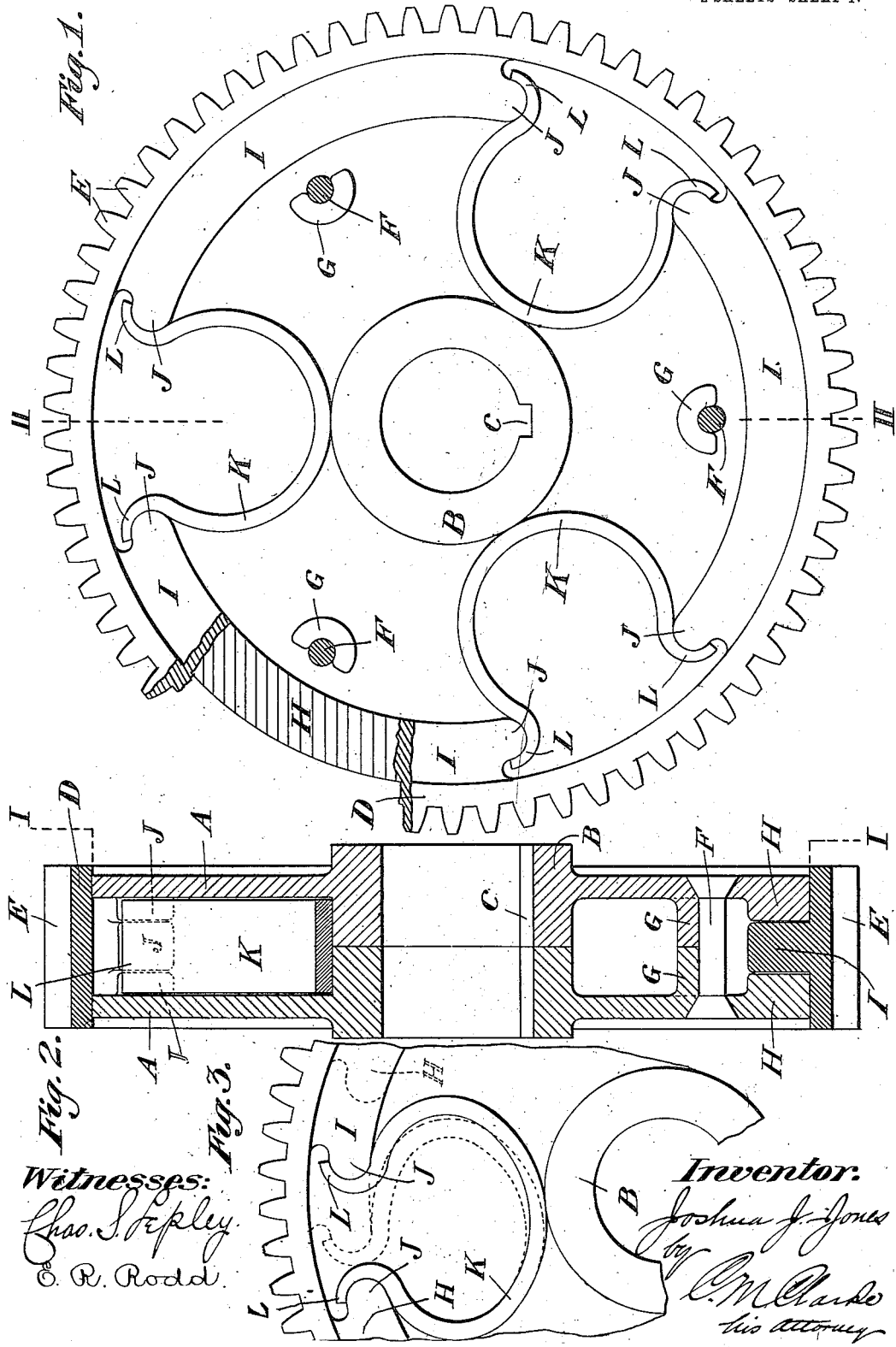
Witnesses:
Chas. S. Ripley.
E. R. Rodd.
Inventor:
Joshua J. Jones
by
C. M. Clarke
his attorney No. 870,106. PATENTED NOV. 5, 1907.
J. J. JONES.
GEAR WHEEL.
APPLICATION FILED FEB. 18, 1907.
2 SHEETS—SHEET 2.
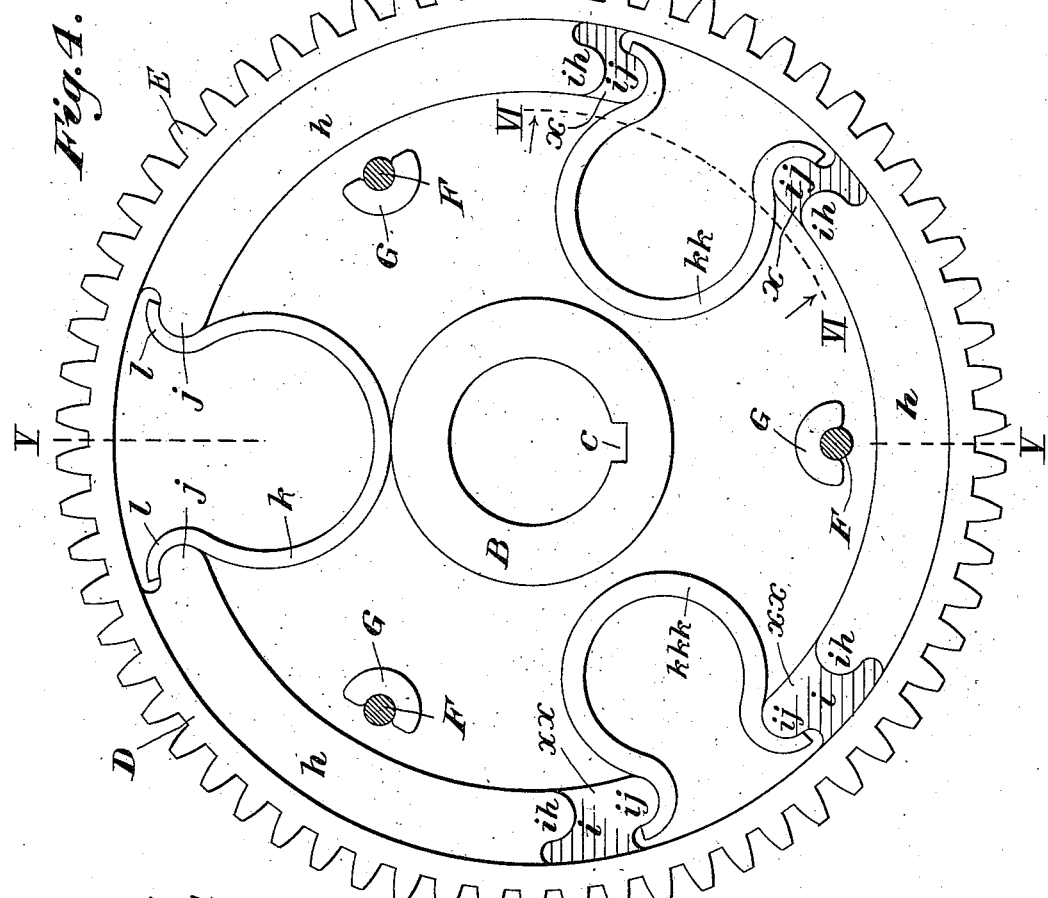
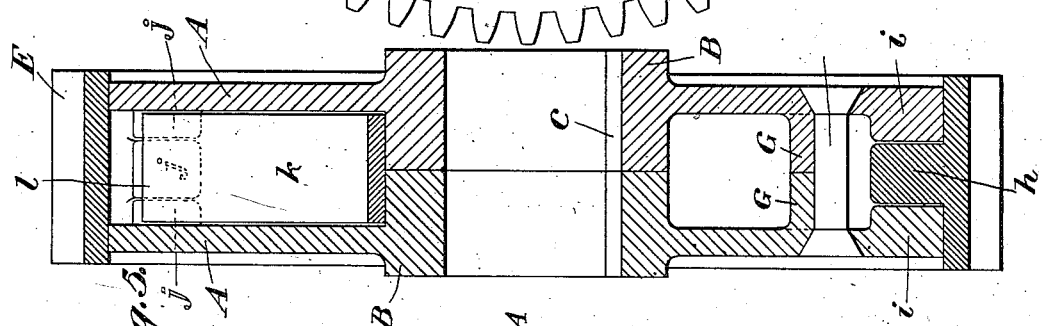
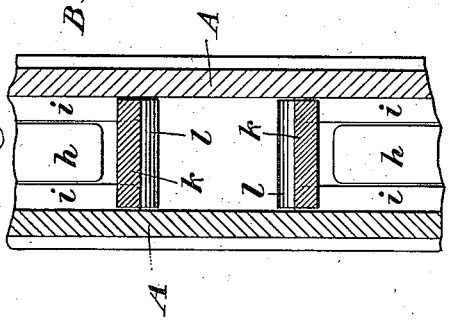
Witnesses: Inventor:
Chas. S. Lepley. Joshua J. Jones
E. R. Rodd. by V. C. M. Clarke
his Attorney

UNITED STATES PATENT OFFICE.

JOSHUA J. JONES, OF AVALON, PENNSYLVANIA.

GEAR-WHEEL.

No. 870,106.            Specification of Letters Patent.            Patented Nov. 5, 1907.

Application filed February 18, 1907. Serial No. 357,886.

*To all whom it may concern:*

Be it known that I, JOSHUA J. JONES, a citizen of the United States, residing at Avalon, in the county of Allegheny and State of Pennsylvania, have invented certain new and useful Improvements in Gear-Wheels, of which the following is a specification, reference being had therein to the accompanying drawing.

My invention refers to improvements in gear wheels and is designed to provide a construction whereby the motion or power exerted against the rim of the wheel is transmitted to a shaft, or to portions of the wheel rigidly mounted on the shaft, through intervening cushioning devices for the purpose of absorbing the preliminary shock of impact due to the actuating element, as a driving pinion.

The invention utilizes the increasing resisting pressure of a spring or springs of special construction which are adapted to be compressed and to impart rotary motion to the shaft when the energy of the spring, due to its compression, equalizes the resistance; or if the resistance is greater than the compressed energy of the spring, to utilize such compressed energy prior to positive driving engagement.

The invention also contemplates the employment of such compression spring in units of varying strength and so located with relation to the parts of the mechanism that the energy of one spring is successively supplemented by that of others, and whereby the combined or accumulated energy is exerted toward the same ultimate object.

The invention is clearly disclosed in the accompanying drawings in which:—

Figure 1. represents a view of the wheel in interior elevation, partly broken away, one of the sides having been removed, as indicated by the section line 1. 1. of Fig. 2. Fig. 2. is a vertical cross section on the line II. II. of Fig. 1. Fig. 3. is a partial detail view similar to Fig. 1, showing one of the springs under partial compression, and indicating complete compression and driving contact in dotted lines. Fig. 4. is a view similar to Fig. 1, but illustrating the employment of a plurality of springs of varying strength, so mounted as to be utilized successively. Fig. 5. is a vertical sectional view on the line V. V. of Fig. 4. Fig. 6. is a sectional detail view on the line VI. VI. in the direction of the arrows.

Referring to Sheet 1 of the drawings, the body portion of the wheel is formed of the sides A, A, integral with hubs B. B. which meet at or about the middle portion of the wheel and are keyed to the shaft by the usual keyway C. D is the rim of the wheel, mounted concentrically upon the peripheries of sides A, A, and free to rotate thereon entirely independent of the sides, except as limited by the intervening shock-absorbing and power-transmitting springs hereinafter described. Said rim D is provided around its external periphery with ordinary gear teeth E as shown, or sprocket teeth, or may be left entirely smooth in the manner of a pulley, for belt transmission. The sides A, A, may be rigidly connected together in any suitable manner, as by means of bolts or rivets F located at intervals, each side being preferably provided with inwardly extending bracing abutments G, G, of any suitable form, so that when thus connected and mounted upon a shaft, the sides A will practically comprise a single wheel with an intervening annular space. At certain points around the outer edges of the sides A, A, they are provided with inwardly extending abutments H, while the ring D is provided with corresponding abutments I adapted to fit between said abutments H, and said abutments substantially match each other in construction, particularly at their ends. The ends of all of the abutments are so formed at their opposite ends as to be engaged by the terminals of the springs, for which purpose they are rounded as indicated at J and such abutment ends are normally adjacent to each other a sufficient distance to permit of the insertion between them of the springs, preferably under a certain predetermined amount of pressure. K represents the springs, of U form and preferably having the outwardly turned extremities L, the springs being of substantially the same width as the combined width of the assembled abutments H, I, and H, as clearly shown in Fig. 2. The width of the relatively movable abutments I of the wheel rim D is substantially double that of the abutments H, H, of the sides A, so that they will engage relatively about the same area of the springs in either the normal condition of the device, or when in action.

The operation of the construction as thus assembled is as follows:—Motion being imparted to the peripheral rim D, it will travel independent of the sides A, the end L of spring K bearing against abutment I being shifted by such abutment toward the relatively stationary resisting abutments H, H, as clearly indicated in Fig. 3. Such compression will continue until the resisting load of the shaft through hubs B and sides A, is overcome, or until the terminals L of the springs are in contact as indicated at the left side of Fig. 3, whereupon, the rim D having traveled through its entire available independent range, will impart positive actuating motion to the wheel and shaft. It will be apparent that the device will operate equally well in either direction. After said wheel and shaft are started, the compressed springs may wholly or partially relax, and in action may continue to vibrate, depending upon the load.

The construction as just described, contemplates the use of either one or several springs, in which latter case all of the springs operate together and are compressed simultaneously.

On Sheet 2 of the drawings I have shown a construction wherein a plurality of springs of different strengths are so arranged that, as heretofore stated, their compressive energy will be successively utilized, for which purpose the springs are so mounted with relation to the wheel sides and periphery as to make successive engagement. For this purpose the adjacent ends $j$ of two sets of abutments $h$ and $i$ respectively terminate on common planes and are engaged by the terminals $l$ of springs $k$ in such a manner as to be operative, in the same manner as has been already described. $k\ k$ represents a similar spring, preferably of greater strength than spring $k$ made in the same manner and normally mounted upon and between the terminals $i\ j$ of abutments $i$ of the wheel sides A, while the corresponding terminals $i\ h$ of the rim abutments $h$ are normally located backwardly from the spring terminals at each side, leaving an intervening space $x$. The same arrangement is provided for the next succeeding spring $k\ k\ k$ normally engaging terminals $i\ j$ of wheel side abutments $i$, while the terminals $i.\ h$ of the rim abutments $h$ are located a somewhat further distance back from the spring terminals at each side, approximately twice the distance as in the case of spring $k\ k$ just described, leaving a corresponding longer space $x\ x$. The resulting effect of such arrangement is that the compressed resiliency of spring $k$ is first utilized to an extent, after which the further reduction of said spring $k$ and then that of $k\ k$, is accomplished, after which both of said springs are further compressed in addition to then compressing the third spring $k\ k\ k$, after which all the springs are compressed together and their terminals will make abutting contact simultaneously, if motion has not previously been imparted to the wheel and shaft during the compressing action of the springs.

The especial advantage of the last described construction is that the resiliency of each spring is utilized successively or cumulatively while the effect of each successive spring is added to that of the preceding one, thereby rapidly increasing the effect of the spring within a comparatively short travel.

The advantages of the invention will be readily appreciated by all those familiar with this class of machinery. The construction is comparatively simple, composed of few parts, readily taken apart or assembled, and will be found to perform its functions in a very satisfactory and efficient manner.

The invention may be changed or varied in different details, as for instance by the number or form of the springs according to the size of the wheel or in other respects, but all such changes are to be considered as within the scope of the following claims.

What I claim is:

1. A wheel comprising outer side portions, and a relatively movable rim portion, each of said portions having bearing abutments, and a U shaped spring having terminals engaging said abutments, substantially as set forth.

2. A wheel comprising outer side portions having bearing abutments, a relatively movable rim portion having similar bearing abutments, and a U shaped spring having oppositely pressing hooked terminals engaging said abutments, substantially as set forth.

3. A wheel comprising outer side portions having bearing abutments upon their inner peripheries and inwardly extending hubs, a relatively movable rim portion mounted on the peripheries of said side portions and having bearing abutments extending between the side portion abutments, and a U shaped ring having oppositely pressing terminals engaging said abutments, substantially as set forth.

4. A wheel comprising outer side portions having oppositely located pairs of bearing abutments, a relatively movable rim portion having corresponding bearing abutments, and a plurality of U shaped springs having oppositely pressing terminals engaging said abutments, substantially as set forth.

5. A wheel comprising outer side portions having bearing abutments, a relatively movable rim portion having similar bearing abutments, and a U shaped spring having oppositely pressing terminals engaging the abutments of the side portions and adapted to be engaged at one side by one of the abutments of the rim upon relative movement thereof, substantially as set forth.

6. A wheel comprising outer side portions and a relatively movable rim portion, each of said portions having bearing abutments assembled together and presenting their bearing ends side by side across the width of the wheel and a spring having terminals adapted to bear against all of said abutments when they are together or to be engaged by one or more of said abutments when one or more of the abutments are shifted with relation to the others, substantially as set forth.

7. In a wheel, the combination of outer side portions provided with a plurality of inwardly extending abutments, a relatively movable rim portion having a plurality of abutments adapted to coöperate therewith, said abutments being assembled side by side across the width of the wheel and providing intervening clearance spaces between their ends, and a plurality of springs inserted in said clearance spaces and bearing by their opposite terminals against the ends of said assembled abutments, substantially as set forth.

8. In a wheel, the combination of outer side portions provided with a plurality of inwardly extending abutments, a relatively movable rim portion having a plurality of abutments adapted to coöperate therewith, said abutments being assembled side by side across the width of the wheel and providing intervening clearance spaces between their ends, and a plurality of springs inserted in said clearance spaces and bearing by their opposite terminals against the ends of some of said assembled abutments and adapted to be engaged by the ends of others of said abutments, substantially as set forth.

In testimony whereof I affix my signature in presence of two witnesses.

JOSHUA J. JONES.

Witnesses:
C. M. CLARKE,
CHAS. S. LEPLEY.